United States Patent [19]
Autenrieth et al.

[11] Patent Number: 6,086,839
[45] Date of Patent: Jul. 11, 2000

[54] SYSTEM AND PROCESS FOR THE WATER VAPOR REFORMING OF A HYDROCARBON

[75] Inventors: Rainer Autenrieth, Erbach; Stefan Boneberg, Blaustein; Dietmar Heil, Hoerenhausen; Martin Schuessler, Ulm; Barbara Strobel, Dornstadt; Steffen Wieland, Stuttgart; Detlef zur Megede, Kirchheim/Teck, all of Germany

[73] Assignee: DBB Fuel Cell Engines GmbH, Kirchheim/Teck-Nabern, Germany

[21] Appl. No.: 09/206,380

[22] Filed: Dec. 7, 1998

[30] Foreign Application Priority Data

Dec. 5, 1997 [DE] Germany .............. 197 54 013

[51] Int. Cl.$^7$ .................. B01J 8/04; B01J 10/00
[52] U.S. Cl. ............. 423/350; 423/418.2; 423/651; 423/652; 252/373; 422/190; 422/194; 422/198
[58] Field of Search .................. 423/650, 651, 423/652, 418.2; 252/373; 422/190, 194, 198, 171, 173

[56] References Cited

U.S. PATENT DOCUMENTS

| | | | |
|---|---|---|---|
| 3,909,299 | 9/1975 | Corrigan | 422/190 |
| 4,746,329 | 5/1988 | Christner et al. | 48/61 |
| 4,820,594 | 4/1989 | Sugita et al. | 429/17 |
| 5,110,559 | 5/1992 | Kondo et al. | 422/109 |
| 5,516,344 | 5/1996 | Corrigan | 48/127.9 |
| 5,904,913 | 5/1999 | Bohm | 423/648.1 |

FOREIGN PATENT DOCUMENTS

| | | |
|---|---|---|
| 0 529 329 | 3/1993 | European Pat. Off. |
| 0 861 802 | 9/1998 | European Pat. Off. |
| 1 417 758 | 10/1965 | France . |
| 1417757 | 10/1965 | France . |
| 1417758 | 10/1965 | France . |
| 38 03 080 | 8/1989 | Germany . |
| 38 03 080 A1 | 8/1989 | Germany . |
| 7-126001 | 5/1995 | Japan . |
| 7-232901 | 9/1995 | Japan . |

OTHER PUBLICATIONS

Patent Abstracts of Japan, 07126001 A, May 16, 1995, Tanizaki Katsuji et al.
Patent Abstracts of Japan, 08259201 A, Oct. 8, 1996, Ezaki Yoshimi et al.
Patent Abstracts of Japan, 08259202 A, Oct 8, 1996, Ezaki Yoshimi et al.
Patent Abstracts of Japan, 07232901 A, Sep. 5, 1995, Ishiko Yukimoto et al.
Patent Abstracts of Japan, C–460, Nov. 27, 1987, vol. 11, No. 365, 62–138307 (A), Jun. 22, 1987, Shigeki Yonezawa.

*Primary Examiner*—Steven P. Griffin
*Assistant Examiner*—Maribel Medina
*Attorney, Agent, or Firm*—Evenson, McKeown, Edwards & Lenahan, P.L.L.C.

[57] ABSTRACT

A system for the water vapor reforming of a hydrocarbon includes an evaporator, a prereforming unit, a main reformer, a CO removal unit and at least one catalytic burner unit. A first burner unit is in a thermal contact with the evaporator and a second burner unit is in a thermal contact with the main reformer, and the prereforming unit is in a thermal contact with the CO removal unit by way of one heat conducting separating medium. In addition, the outlet of the CO removal unit is connected with the inlet of the at least one burner unit. During a cold start, a heating-up operation is carried out during which first the two burner units are activated with an external feeding of hydrogen or hydrocarbon, and the reforming operation is started with a hydrocarbon fraction that is lower than in the normal operation. The resulting reformate gas, instead of the externally fed hydrogen or hydrocarbon, is introduced as fuel into the burner units.

11 Claims, 1 Drawing Sheet

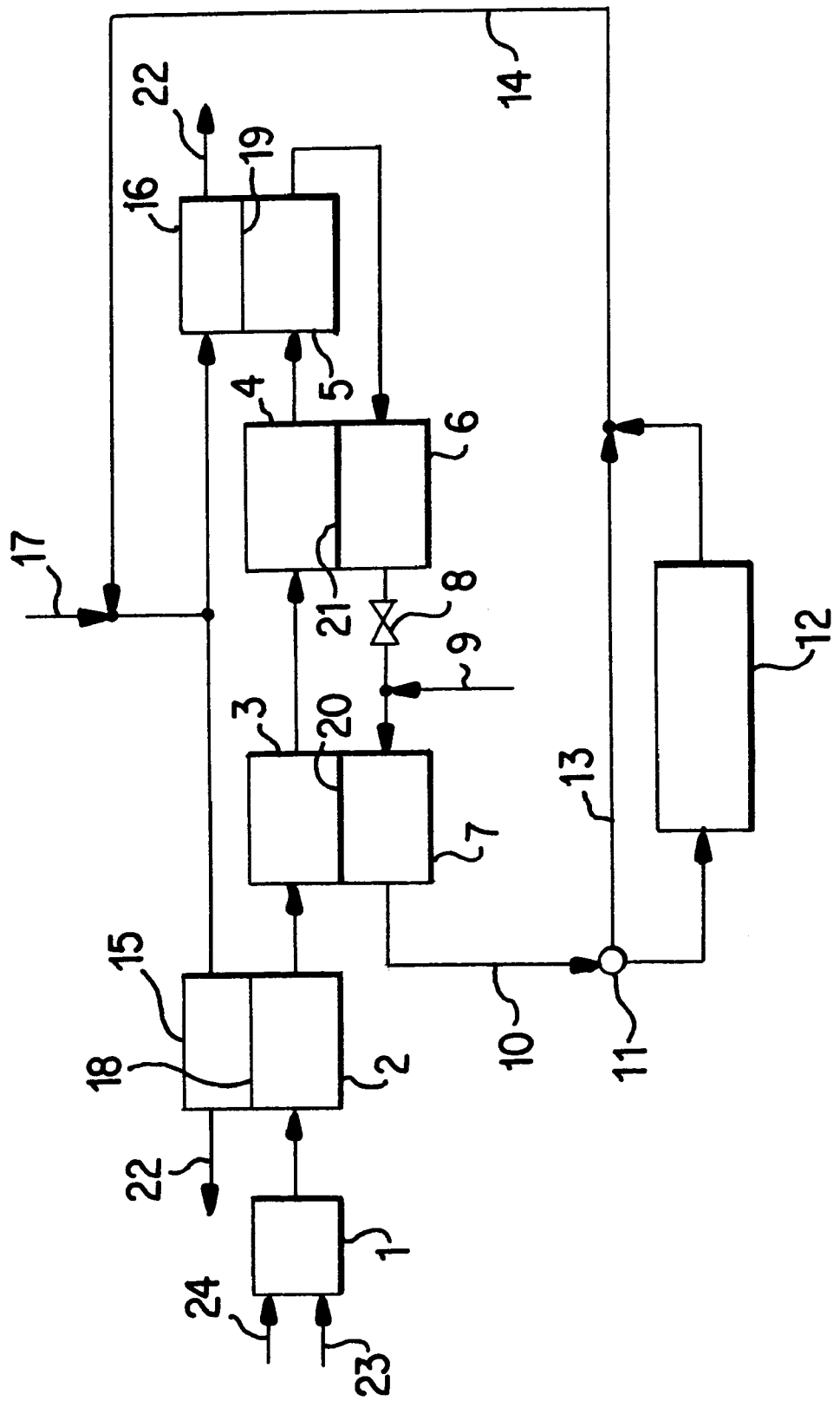

SYSTEM AND PROCESS FOR THE WATER VAPOR REFORMING OF A HYDROCARBON

BACKGROUND AND SUMMARY OF THE INVENTION

This application claims the priority of German Patent Application No. 197 54 013.9, filed Dec. 5, 1997, the disclosure of which is expressly incorporated by reference herein.

The present invention relates to a system and a process for the water vapor reforming of a hydrocarbon. Systems of this type are known, for example, methanol reforming systems for fuel-cell-operated motor vehicles that provide the hydrogen required for the fuel cells. This mobile application, in particular, requires a sufficiently rapid reaction to the typical fast load changes in vehicle operation. This application also requires the ability to supply hydrogen for the fuel cells as rapidly as possible after the respective system start and to achieve this by means of a reforming system that has a relatively compact construction.

The water vapor reforming reaction for reforming a hydrocarbon, such as methanol, takes place endothermally and at a reaction temperature that is raised in comparison to the room temperature. During a cold start of the reforming system, sufficient hydrogen can therefore not immediately be provided by means of the water vapor reforming reaction because the components of the system must first be brought to a corresponding operating temperature. Specifically with respect to the use in fuel-cell-operated motor vehicles, there is the desire to reach the warmed-up normal operation of the reforming system as fast as possible so that the fuel cells can be fed as early as possible with hydrogen generated during the driving operation. Various methods have been suggested for an accelerated cold start of reforming systems.

In U.S. Pat. Nos. 4,820,594 and 5,110,559, a conventional method consists of assigning a burner to the reformer within the reformer housing, in which the reforming reaction is to take place. The burner burns a combustible hydrocarbon/air mixture at an open flame in order to heat up the reformer. U.S. Pat. No. 5,110,559 also suggests that the generated hot combustion exhaust gases be passed into a CO shift converter which follows in order to also heat the CO shift converter.

In French Patent documents FR 1 417 757 and FR 1 417 758, during a cold start of a system for the water vapor reforming of methanol, a mixture of methanol and an oxidant is introduced into the reformer in order to initiate a corresponding combustion reaction and thus heat up the reformer. Then the feeding of the oxidant is terminated, the methanol/water vapor mixture to be reformed is fed, and the reforming reaction is started.

Japanese Laid-Open Application JP 07126001 A describes a compactly constructed reforming system in which an evaporator, a reformer and a CO-oxidant are provided which are part of a plate stack construction and are arranged serially behind one another in a transverse direction perpendicular to the longitudinal stack direction. The three system components can be heated in parallel by means of an assigned burner with pertaining heating layers of a laminar construction.

U.S. Pat. No. 5,516,344 discloses a compactly constructed reforming system in which a reformer and a CO layer converter are arranged underneath one another and divided by a separating plate from one another in a common housing. On the housing, a burner is provided by means of which a fed combustible mixture is burned at an open flame, in which case the hot combustion gases are guided into the housing in order to heat up the reformer and the CO shift converter as well as the various participating gas flows.

U.S. Pat. No. 4,746,329 discloses a methanol reforming reactor of a cylindrical construction consisting of several radially successive annuli. On the underside of the reactor cylinder, a burner unit is situated which may be formed by a catalytic burner. The hot burner exhaust gases are guided through the radially outermost annulus upwards and are then deflected into the radially inner adjacent annulus where they are in a thermal contact with a reforming annulus which adjoins radially on the inside. A top part of the reforming space extends beyond the outer annuli carrying the combustion gas so that a lower operating temperature exists in this area. In this manner, this cooler upper reforming space area is used as a CO shift unit. The reforming space is adjoined on the inside by an evaporator annulus which, in turn, is adjoined radially toward the inside by way of a cylindrical wick by an inner tempering space into which the combustion gases are deflected after flowing downward to the second outermost annulus in the lower cylinder area. The hydrogen-containing anode gas of a fuel cell system is used as fuel for the burner unit. The combustion exhaust gases therefore contain water vapor, of which at least a portion is fed to the evaporator after the combustion exhaust gases flow out at the upper cylinder face.

German Published Patent Application DE 38 03 080 A1 discloses a reforming system for generating synthesis gases containing hydrogen, carbon monoxide and carbon dioxide as well as an operating process therefor. The charged substances are first subjected to an at least one-stage primary reforming, then to a partial oxidation, subsequently to another secondary reforming and finally to a carbon monoxide conversion. In this case, the waste heat of the exothermal carbon monoxide conversion is utilized for the primary vapor reforming, for the purpose of which the corresponding primary reforming stage and the CO conversion stage are in a thermal contact with one another by way of a heat-conducting separating wall.

The present invention is based on the technical problem of providing a system and a process by means of which, during a cold start, the warmed-up normal operation can be reached as fast as possible for the effective implementation of the reforming reaction, for example, for rapidly providing hydrogen for a fuel cell system of a motor vehicle.

By means of the system according to the present invention, an evaporator as well as a main reformer can be heated by way of a respective burner unit, in which a combustible mixture can be burned in a catalytically flameless manner. As a result, the evaporator and the main reformer can be heated directly after a cold start. Simultaneously, at least one prereforming stage is in a thermal contact with a CO shift stage or a CO oxidation stage. Thus, these components, which are coupled in a heat-conducting manner, can be brought jointly to their normal operating temperature by the direct or indirect heating of one of the two components during a heat-up operation at the cold start. In addition, the outlet of the CO removal unit can be connected directly with the inlet of the respective catalytic burner unit. As a result, catalytically combustible gas which exists at the outlet of the CO removal unit can be fed, as required, into the catalytic burner unit for the purpose of being burned there, in order to contribute, alone or in addition to fuel directly fed there, to a fast heating-up of the evaporator and of the main reformer.

An advantageous heating-up operating during a cold start is contained in the process according to the present invention. In a first operating phase, hydrogen or the hydrocarbon to be reformed in normal operation is fed as fuel into the catalytic burner units and is catalytically burned there with an additional feeding of an oxygen-containing gas in order to heat up the burner units to preferably 150° to 350° C., whereby the evaporator and the main reformer are heated correspondingly. In a subsequent second operating phase, the hydrocarbon/water vapor mixture required for the reforming is then started in the preheated evaporator. At this point in time, a portion of hydrocarbon lower in comparison to the later normal operation is fed into the evaporator. The mixture heated in the evaporator is guided through the prereforming unit, whereby the preforming unit and also the CO shift stage and/or the CO-oxidation stage which are in a thermal contact with it are heated. In the preheated main reformer, the still comparatively low amount of fed hydrocarbon can be reformed. The resulting hydrogen-rich reformate heated by the main reformer reaches the CO removal unit which, as a result, is additionally heated up, and from there, arrives in the catalytic burner units, where it may be used as fuel so that the direct feeding of a corresponding fuel can be stopped or at least reduced. During this heating-up operation, the evaporator and/or the main reformer can be operated at a temperature above the normal operating temperature in order to further accelerate the heating-up operation. As soon as the system components have essentially reached their warmed-up operating condition, a change takes place to the normal operation in that the portion of the hydrocarbon to be reformed which is fed into the evaporator is increased correspondingly. The reformate gas, which exists at the outlet side of the CO removal unit will then essentially consist of hydrogen, while carbon monoxide is not present to an interfering degree. Thus, product gas does not have to be fed any longer into the catalytic burner units but can be provided to the intended use, for example, for feeding the anode side of a fuel cell system.

In the case of another embodiment of the present invention, the prereforming unit contains two prereforming stages, and the CO removal unit has a CO shift stage as well as a CO oxidation stage that are serially situated behind one another. The CO shift stage and CO oxidation stage are each in thermal contact with one prereforming stage respectively in order to promote the fast heating-up of these components during the cold start. In addition, devices are provided for shutting off the connection between the CO shift stage and the CO oxidation stage, as well as an intermediate feeding line which leads downstream of these shut-off devices to the CO oxidation stage. By way of the intermediate feeding line, a substance, such as a combustible mixture, can be fed in a targeted manner into the CO oxidation stage. For the operation of this system, a process according the present invention is used in which the connection between the CO shift phase and the CO oxidation phase is separated at the start of the first operating phase and is opened up again at the start of the second operating phase. Simultaneously, during the first operating phase by way of the pertaining intermediate feeding pipe into the CO oxidation stage, a catalytically combustible mixture is introduced there, whereby the CO oxidation stage is directly heated up in an active manner.

In its warmed-up operating condition, another embodiment according to the present invention is used for feeding a fuel cell system with the required hydrogen by supplying the hydrogen-rich reformate gas. During the heating-up operation at a cold start, in order to feed the gas that is present at the outlet of the CO removal unit and which may be damaging to the fuel cell system directly to the catalytic burner units, while by-passing the fuel cell system, a corresponding change-over valve is provided. In this case, the gas present on the outlet side of the CO removal unit is not connected before the end of the second operating phase of the heating-up operation during a cold start with the corresponding inlet of the fuel cell system, while it is otherwise guided into the catalytic burner units.

During another embodiment of the present invention, the system pressure in the reforming gas flow path is raised during the heating-up operation from zero to the normal operating pressure in the normal operation.

In the case of another embodiment of the present invention, the hot combustion exhaust gases of the catalytic burner units are used for heating up a cooling circulation of a fuel cell system whose anode side is fed in the normal operation by hydrogen-rich reformate gas.

A flowing of the hot combustion exhaust gases of the catalytic burner units through additional flow ducts, which are provided in one or several not actively heated system components, contributes to the further acceleration of the heating-up operation.

Other objects, advantages and novel features of the present invention will become apparent from the following detailed description of the invention when considered in conjunction with the accompanying drawings.

BRIEF DESCRIPTION OF THE DRAWING

The single FIGURE is a view of a block diagram of a system for the water vapor reforming of a hydrocarbon.

DETAILED DESCRIPTION OF THE DRAWING

The reforming system which is block-diagrammatically illustrated in the FIGURE is usable for the water vapor reforming of methanol in a fuel-cell-operated motor vehicle in order to generate the hydrogen required for the fuel cell system from methanol carried along in liquid form.

On the inlet side, the system contains a metering device 1 to which water and liquid methanol are fed by way of two pertaining inlet pipes 23, 24, and which has suitable metering pumps for metering these substances into a connected evaporator 2 in controllable portions. The evaporator 2 is adjoined by a prereforming unit which consists of two prereforming stages 3, 4 connected behind one another and whose outlet leads to the inlet of a main reformer 5. The outlet of the main reformer 5 is adjoined by a CO removal unit which consists of a CO shift stage 6 and of a CO oxidation stage 7 connected behind the CO shift stage 6. A triggerable shut-off valve 8 is situated in the connection between the CO shift stage 5 and the CO oxidation stage 7. Downstream of this shut-off valve 8, an intermediate feeding pipe 9 leads into this connection. A product gas pipe 10 leading away from the CO oxidation stage 7 leads to a triggerable switch valve 11 by means of which the product gas flow is optionally guided either to a fuel cell system 12 or, while by-passing the latter through a by-pass pipe 13, directly to a fuel feeding pipe 14, to which two catalytic burner units 15, 16 are connected. The fuel feeding pipe 14 may optionally have a separate feeding connection 17, as indicated in the figure by a broken line, in order to, as required, feed a combustible mixture, while by-passing the CO oxidation stage 7, directly into the catalytic burner units 15, 16. As an alternative to the illustrated parallel arrangement, the two burner units 15, 16 may be arranged serially.

The evaporator 2 and the main reformer 5 are in a thermal contact with one of the two catalytic burner units 15, 16 respectively by way of a respective heat-conducting separating wall 18, 19. In the same manner, the first preforming stage 3 is in a thermal contact with the CO oxidation stage 7 and the second preforming stage 4 is in a thermal contact with the CO shift stage 6 by way of one heat-conducting separating wall 20, 21 respectively. The two preforming stages 3, 4, the main reformer 5, the CO shift stage 6 and the CO oxidation stage 7 each contain conventional catalyst materials for these components and are of one of the conventional construction types. In this case, the block diagram representation in the figure must not be understood such that separately illustrated blocks are necessarily part of spatially separated components. On the contrary, as required, in a conventional manner, components which are drawn separately in the block diagram may be integrated in a common constructional unit.

In the normal operation with a warmed-up system, the metering device 1 meters water and methanol in defined portions into the evaporator 2. From this, the evaporator 2 prepares an overheated methanol/water vapor mixture which is then guided into the first preforming stage 3 and from there into the second preforming stage 4 and during this operation is subjected to corresponding preforming processes. Subsequently, the preformed mixture arrives in the main reformer 5, where the principal reforming conversion of the methanol takes place. The thus-formed, already hydrogen-rich reformate gas which, however generally still contains a CO fraction which is too high, flows from the main reformer 5 into the CO shift stage 6, where the CO concentration is reduced by the CO shift reaction, that is, by way of the water gas equilibrium. By way of the shut-off valve 8 opened in the normal operation, the reformate gas flow is then introduced into the CO oxidation stage 7, in which the CO concentration is reduced again, specifically while utilizing the CO oxidation reaction. For this purpose, as required, air or another oxygen-containing gas flow can be metered by way of the intermediate feeding pipe 9 into the CO oxidation stage 7.

The reformate gas, which is delivered at the outlet of the CO oxidation stage 7 and can be removed by way of the product gas pipe 10, therefore consists essentially of hydrogen, in which case the CO concentration is below a defined limit value which ensures that the catalyst material coming in contact with the reformate gas in the fuel cell system is not poisoned. By way of the correspondingly switched switch valve 11, the reformate gas is fed into the anode part of the fuel cell system 12. By way of the burner feed pipe 14, the gas flowing out of the anode part can be fed into the catalytic burner units 15, 16. The operation of the burner units 15, 16, optionally promoted by an additional fuel feeding by way of the feeding connection 17, is operated to an extent required for maintaining the operating temperatures in the various system components. In this case, the burner units 15, 16 heat the evaporator 2 and the main reformer 5 carrying out the endothermal reforming reaction. The two preforming stages 3, 4 are maintained at the temperature by the hot substance mixture to be reformed which is flowing through, which analogously applies to the CO shift stage 6 and the CO oxidation stage 7 because of the hot reformate gas flow which passes through, in which case, by way of the heat-conducting combustion walls 20, 21, heat can additionally be transmitted between the two preforming stages 3, 4, on the one hand, and the CO shift stage 6 as well as the CO oxidation stage, on the other hand, by means of a solid-state heat conduction.

The system, which is constructed as illustrated, after the triggering of a cold start, as it frequently occurs particularly when used in vehicles, is suitable for a comparatively fast providing of the hydrogen-rich reformate gas, that is, for a fast reaching of the warmed-up operating condition. For this purpose, after a cold start is triggered, a heating-up operation is carried out which has several different operating phases. At the start of a first operating phase, the connection between the CO shift stage 6 and the CO oxidation stage 7 is cut by closing the shut-off valve 8. In addition, the fuel cell system 12 is taken out of the gas flow path in that the switch valve 11 is switched such that the product gas pipe 10 is connected with the by-pass pipe 13. During the first operating phase, a combustible gas is then fed to the CO oxidation stage 7 by way of the intermediate feeding pipe 9, which mixture contains methanol and/or an intermediately stored hydrogen as the fuel as well as an oxygen-containing gas, such as air. In the CO oxidation stage 7, the mixture is burned at least partially catalytically, whereby the CO oxidation stage 7 and therefore the first preforming stage 3, which is in a thermal contact with it, are heated up, preferably to a temperature of between 150° C. and 350° C. Heating takes place by means of corresponding catalytic combustion processes in the two burner units 15, 16, for the purpose of which combustible constituents from the CO oxidation stage 7 are also fed to these units 15, 16 by way of the product gas pipe 10, the by-pass pipe 13 and the burner feeding pipe 14 and, according to the requirement, additionally a combustible mixture is fed by way of the feeding connection 17. By means of the resulting heating of the two burner units 15, 16, the evaporator 2 and the main reformer 5 are heated correspondingly. In this case, during the heating-up operation, the evaporator 2 and the main reformer 5 are preferably operated at a temperature which is above the operating temperature in the later normal operation in order to accelerate the heating-up operation.

As soon as the system components have reached a certain warmed-up operating condition, which permits the starting of a reforming operation to a limited extent, a change-over takes place from the first to a second operating phase. At the start of the second operating phase, the connection is opened up between the CO shift stage 6 and the CO oxidation stage 7 by opening the shut-off valve 8, and the additional feeding of hydrogen and/or methanol by way of the feeding connection 17 into the two burner units 15, 16 as well as by way of the intermediate feeding pipe 9 into the CO oxidation stage 7 is preferably reduced to zero. Simultaneously, the metering of water and methanol into the evaporator 2 is started, in which case, in this second operating phase, the methanol is fed only at a fraction which is lower than in the normal operation when the system has warmed up. From this, the evaporator 2 prepares a relatively water-rich methanol/water vapor mixture which is forwarded into the first preforming stage 3 and, from there, into the second preforming stage 4. In this case, the two preforming stages 3, 4 are additionally heated up by the hot mixture which flows through. Simultaneously, the hot mixture experiences a certain preforming. The mixture then arrives in the preheated main reformer 5 and is heated there again, while simultaneously the principal methanol reforming conversion takes place. The thus formed, hot, hydrogen-rich reformate gas flow is guided into the CO shift stage 8 which, as a result, and also by the thermal contact with the second preforming stage 4, heats up further. Simultaneously, the CO concentration is reduced by way of the CO shift reaction. The reformate gas will then, by way of the open shut-off valve 8, arrive in the CO oxidation phase 7 and from there further by way of the product gas pipe 10, the by-pass pipe 13 and the burner feeding pipe 14 in the two burner units 15, 16. In this case, the hydrogen contained in the reformate gas is catalytically burned in the CO oxidation stage 7 and the two burner units 15, 16, in which case the oxygen-containing gas, such as air, required for this purpose is metered in by way of the intermediate feeding pipe 9 and, as required, additionally by way of the feeding connection 17.

The heat generated by these exothermal combustion processes has the purpose of maintaining the system components at the appropriate temperature and providing the energy for evaporating the constituents water and methanol metered in a liquid stage into the evaporator 2 as well as of implementing the endothermal reforming reaction. In this case, the metered-in methanol quantity in this second operating phase is selected to be just so large that its energy content is sufficient for applying the evaporation and reforming energy required for the methanol/water vapor mixture, without overheating the burner units 15, 16 and the CO oxidation stage 7. In contrast, the metered-in water fraction, during the second operating phase, compared to the later normal operation, is adjusted to a clearly higher value. The excess water is used for cooling the evaporator 2 and as a heat transfer medium, by means of which the heat can be guided even faster into the not actively heated system components. As a further measure, during the heating-up operation, the system pressure of the system is increased from zero to the normal operating pressure which is maintained in the later normal operation. This comprises particularly a corresponding pressure increase of the methanol/water vapor mixture during the second operating phase.

As soon as the system has essentially reached its normal operating temperature and its normal operating pressure, the second operating phase is terminated and a change takes place from the heating-up operation to the normal operation of the system. For this purpose, the fraction of the methanol metered into the evaporator 2 is increased to the normal operating value, and the switch valve 11 is switched in order to introduce, as of this point in time, the reformate gas guided out by way of the product gas pipe 10, which essentially consists of hydrogen, into the fuel cell system 12. Subsequently, the system is operated in the normal operation, as explained above.

The above description of an advantageous embodiment shows that, by means of the present invention, an efficient system for the water vapor reforming of a hydrocarbon which can be constructed in a simple manner and an operating process therefor can be implemented by means of which, in the case of a cold start, the reforming system can be brought very rapidly to its normal warmed-up operating condition. In addition to the above-explained example and the variants mentioned there, additional embodiments of the invention can be implemented. Thus, for example, the preforming unit may consist of only one preforming stage and the CO removal unit may consist only of the CO shift stage or the CO oxidation stage, in which case the two corresponding stages will be in a thermal contact with one another. Furthermore, the hot combustion exhaust gas emerging from the burner units 15, 16 can be used for heating up a cooling circulation provided for the fuel cell system 12. Another option consists of providing heating ducts, through which a flow can take place, in the not actively heated system components, such as the preforming stages 3, 4 and the CO shift stage 6, through which heating ducts, during the heating-up operation, for its acceleration, the hot combustion exhaust gas 22 of the burner units 15, 16 can be guided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for the water vapor reforming of a hydrocarbon, comprising:
    an evaporator;
    a preforming unit connected to the evaporator and having at least one preforming stage;
    a main reformer connected to the preforming unit;
    a CO removal unit connected to the main reformer and having at least one of a CO shift stage and a CO oxidation stage;
    a first catalytic burner that is in a thermal contact with the evaporator by way of a heat-conducting separating medium;
    a second catalytic burner that is in a thermal contact with the main reformer by way of a heat-conducting separating medium;
    wherein an outlet of the CO removal unit is connected directly with the inlet of at least one of the catalytic burners; and
    wherein the at least one preforming stage is in a thermal contact with at least one of the CO shift stage and the CO oxidation stage by way of a heat conducting separating medium.

2. The system according to claim 1, wherein the preforming unit comprises two serially arranged preforming stages and the CO removal unit comprises a CO shift stage and a CO oxidation stage connected to the CO shift stage;
    wherein one preforming stage is in a thermal contact with the CO oxidation stage and the other preforming stage is in a thermal contact with the CO shift stage.

3. The system according to claim 2, further comprising a device for shutting off a connection between the CO shift stage and the CO oxidation stage and a device for intermediate feeding into the CO oxidation stage.

4. The system according to claim 1, further comprising a switch valve by means of which the outlet of the CO removal unit can optionally be connected directly with a burner feeding pipe or with a gas inlet of a fuel cell system.

5. A process for the water vapor reforming of a hydrocarbon comprising heating a reforming system from a cold start, comprising:
    feeding and burning a combustible mixture comprising at least one of hydrogen and a hydrocarbon, and an oxygen-containing gas into at least one catalytic burner, thereby heating an evaporator and main reformer;
    terminating the feeding and burning of the at least one of hydrogen and hydrocarbon;
    feeding water and a hydrocarbon having a first hydrocarbon fraction into the evaporator, thereby forming a heated mixture;
    guiding the heated mixture into a preforming unit and then into the main reformer, thereby heating the preforming unit and forming a reformate gas;
    guiding the reformate gas into the at least one catalytic burner and burning the reformate gas, thereby heating the reforming system to its warmed-up operating temperature.

6. The process according to claim 5, further comprising:
    reducing the guiding of the reformate gas into the at least one catalytic burner;

feeding water and a hydrocarbon having a second hydrocarbon fraction into the evaporator, wherein the second hydrocarbon fraction is greater than the first hydrocarbon fraction, to thereby form a hydrocarbon/water vapor mixture;

guiding the hydrocarbon/water vapor mixture into at least one prereforming stage and then into a main reformer, thereby forming a reformate gas comprising hydrogen and carbon monoxide; and at least partially removing the carbon monoxide in a CO removal unit.

7. The process according to claim 5, further comprising cutting a connection between a CO shift stage and a CO oxidation stage, wherein by way of an intermediate feeding device, the feeding of the combustible mixture is first into the CO oxidation stage and then into the at least one catalytic burner; and opening the connection after terminating feeding of at least one of hydrogen and hydrocarbon, wherein by way of the intermediate feeding device, an oxygen-containing gas is fed into the CO oxidation stage.

8. The process according to claim 5, further comprising:

initially connecting an outlet of a CO removal unit directly with a burner feeding pipe; and after the reforming system has reached its warmed-up operating temperature, connecting the outlet with a corresponding inlet of a fuel cell system.

9. The process according to claim 5, wherein the gas pressure in the reforming system is increased from zero to an operating pressure.

10. The process according to claim 5, further comprising heating up a cooling circulation of a fuel cell system with hot combustion exhaust gas from the at least one catalytic burner.

11. The process according to claim 5, further comprising guiding combustion exhaust gas from the at least one catalytic burner through heating ducts into at least one of a prereforming stages and a CO shift stage.

* * * * *